(12) United States Patent
Zhu et al.

(10) Patent No.: US 12,587,595 B2
(45) Date of Patent: Mar. 24, 2026

(54) ROLLABLE SCREEN DEVICE THERMAL MITIGATION

(71) Applicant: Motorola Mobility LLC, Chicago, IL (US)

(72) Inventors: Xiaofeng Zhu, Nanjing (CN); Sanjay Dhar, Algonquin, IL (US); Rohit Sisodia, Naperville, IL (US); Sridhar Vashist, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 322 days.

(21) Appl. No.: 18/192,903

(22) Filed: Mar. 30, 2023

(65) Prior Publication Data

US 2024/0314231 A1 Sep. 19, 2024

(30) Foreign Application Priority Data

Mar. 15, 2023 (CN) .......................... 202310269220.3

(51) Int. Cl.
*H04M 1/02* (2006.01)
(52) U.S. Cl.
CPC ................................. *H04M 1/0208* (2013.01)
(58) Field of Classification Search
CPC .................................................. H04M 1/0208
See application file for complete search history.

(56) References Cited

U.S. PATENT DOCUMENTS

| | | | | | |
|---|---|---|---|---|---|
| 6,122,166 | A | * | 9/2000 | Mochizuki | G06F 1/203 |
| | | | | | 361/679.52 |
| 9,818,961 | B2 | * | 11/2017 | Hiroki | G09F 9/301 |
| 10,303,218 | B2 | * | 5/2019 | Jones | H05K 1/028 |
| 10,817,082 | B1 | * | 10/2020 | Yildiz | G06F 3/03545 |
| 2004/0259609 | A1 | * | 12/2004 | Fujii | H04M 1/0225 |
| | | | | | 455/575.3 |
| 2010/0091691 | A1 | * | 4/2010 | Dorsey | H04W 52/0251 |
| | | | | | 370/311 |
| 2016/0293102 | A1 | * | 10/2016 | Chaji | G09G 3/20 |

(Continued)

FOREIGN PATENT DOCUMENTS

CN 118675409 A 9/2024

OTHER PUBLICATIONS

Engadget , "Oppo X 2021 rollable phone hands-on", Youtube, uploaded by Engadget [retrieved Mar. 15, 2023]. Retrieved from the Internet <https://www.youtube.com/watch?v=iF-Hfzntue0>., Mar. 18, 2021, 4 Pages.

(Continued)

*Primary Examiner* — Lewis G West
(74) *Attorney, Agent, or Firm* — FIG. 1 Patents

(57) ABSTRACT

In aspects of rollable screen device thermal mitigation, a mobile device can be configured in a compact form factor and in an expanded form factor. The mobile device includes at least one heat source that generates heat within the mobile device. The mobile device implements a configuration manager that initiates expanding the mobile device from the compact form factor to the expanded form factor based at least in part on one of a thermal load, a device temperature, or a device component temperature. The mobile device can be a foldable mobile device, or an expandable mobile device with a rollable display screen configurable in one of multiple display states corresponding to respective device form factors.

20 Claims, 11 Drawing Sheets

(56) References Cited

U.S. PATENT DOCUMENTS

| | | | | |
|---|---|---|---|---|
| 2018/0164854 | A1* | 6/2018 | Wood .................... | G06F 1/1681 |
| 2019/0286200 | A1* | 9/2019 | Ho ........................ | G06F 1/1618 |
| 2019/0350081 | A1* | 11/2019 | Park ...................... | H05K 1/144 |
| 2021/0034101 | A1* | 2/2021 | Yildiz ................... | G06F 1/203 |
| 2024/0310885 | A1* | 9/2024 | Sisodia ................ | G06F 1/1683 |
| 2024/0338164 | A1* | 10/2024 | Jin ........................ | G06F 1/3265 |

OTHER PUBLICATIONS

Petrov, Daniel , "Who will launch the first rollable display phone in 2023?", PhoneArena [retrieved Mar. 15, 2023]. Retrieved from the Internet <https://www.phonearena.com/news/first-rollable-display-phone-release-2023_id142493>., Sep. 13, 2022, 18 Pages.

\* cited by examiner

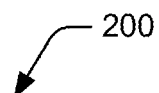
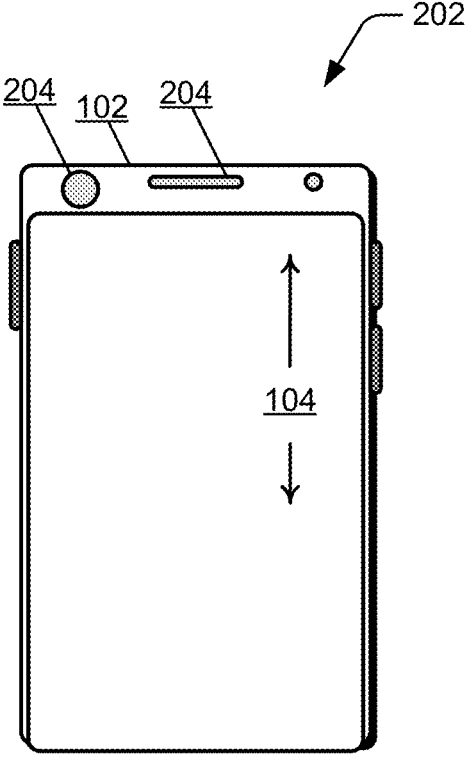
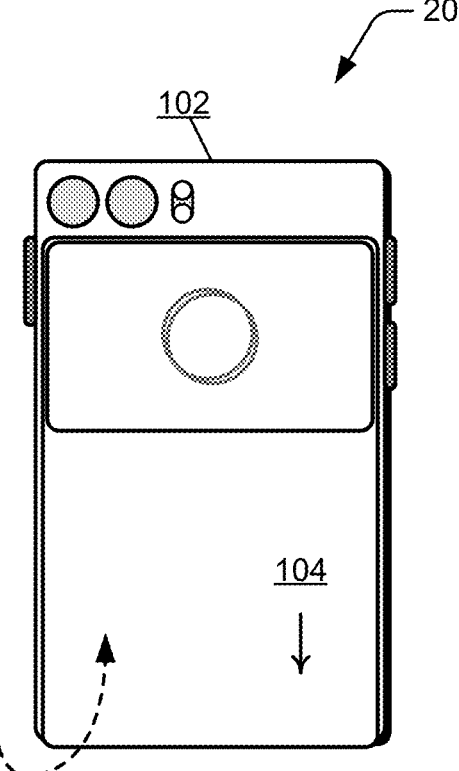
*FIG. 2*

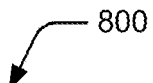

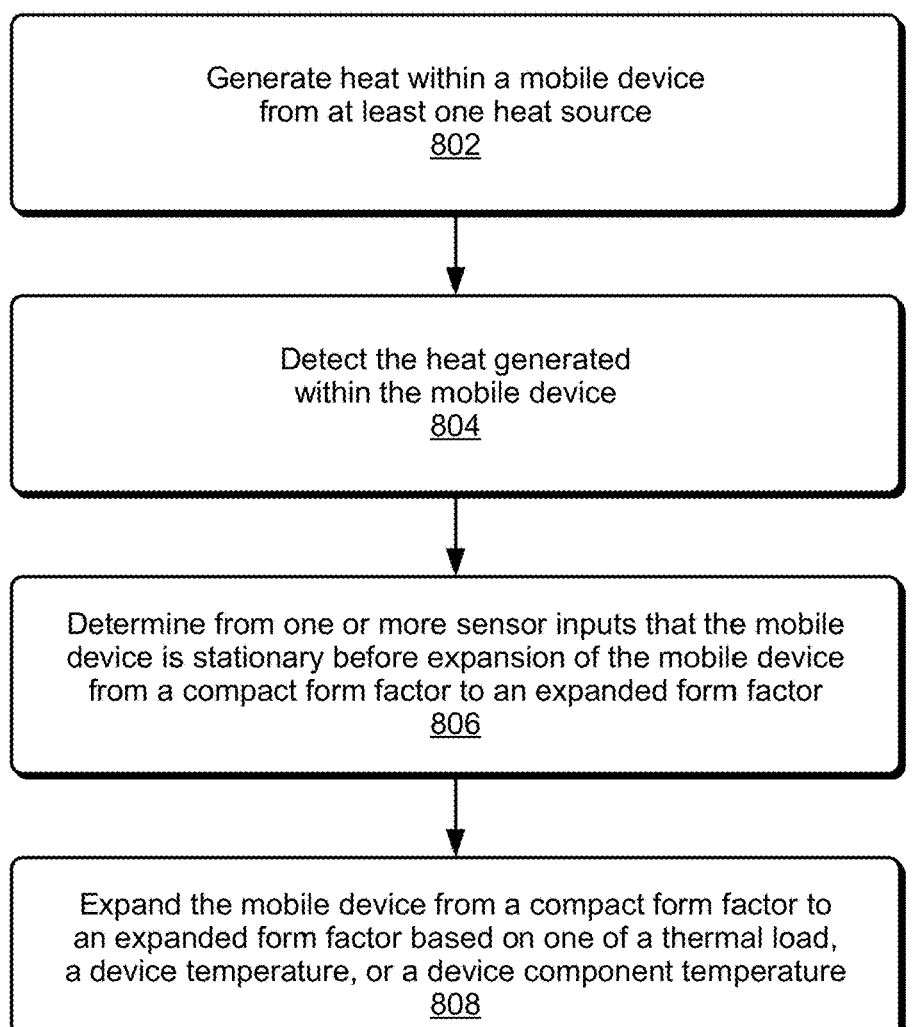

Generate heat within a mobile device
from at least one heat source
802

Detect the heat generated
within the mobile device
804

Determine from one or more sensor inputs that the mobile
device is stationary before expansion of the mobile device
from a compact form factor to an expanded form factor
806

Expand the mobile device from a compact form factor to
an expanded form factor based on one of a thermal load,
a device temperature, or a device component temperature
808

*FIG. 8*

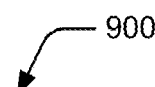

Detect charging a battery
of a mobile device
902

Determine that the mobile device is stationary and charging a
battery of the mobile device before expansion of the mobile
device from a compact form factor to an expanded form factor
904

Expand the mobile device from a compact form factor to
an expanded form factor based on one of a thermal load,
a device temperature, or a device component temperature
906

Detect an end of the
charging the battery
908

Contract the mobile device from the expanded form factor
to the compact form factor based on the end of the charging
the battery and previous expanding of the mobile device
910

*FIG. 9*

Generate heat within a mobile
device by a heat source
1002

Detect, by a sensor, the heat as one of a thermal load, a
device temperature, or a device component temperature
1004

Configure, by a control unit, the mobile device for
increased heat dissipation based on detection of the heat
1006

ROLLABLE SCREEN DEVICE THERMAL MITIGATION

RELATED APPLICATION

This application claims priority benefit of China Patent Application for Invention Ser. No. 202310269220.3 filed Mar. 15, 2023, entitled "Rollable Screen Device Thermal Mitigation", the disclosure of which is incorporated by reference herein in its entirety.

BACKGROUND

Devices such as smart devices, mobile devices (e.g., cellular phones, tablet devices, smartphones), consumer electronics, and the like can be implemented for use in a wide range of environments and for a variety of different applications. Generally, mobile devices come in varying sizes and form factors, such as rectangular with an overall rigid shape, foldable devices with a housing that is hinged allowing a device to fold, and slidable devices with housing sections that slide apart and back together. Consumers typically want smaller devices that are convenient to carry, yet also prefer devices that have some expandability for larger display viewing, such as with the foldable and slidable devices. However, the thermal management of device electronics that generate heat within a device is increasingly challenging as device form factors become smaller, such as for compact mobile phones that are convenient to carry, yet do not efficiently dissipate or manage heat transfer from internal device components.

BRIEF DESCRIPTION OF THE DRAWINGS

Implementations of the techniques for rollable screen device thermal mitigation are described with reference to the following Figures. The same numbers may be used throughout to reference like features and components shown in the Figures:

FIG. 2 further illustrates example views of a mobile device, which supports rollable screen device thermal mitigation in accordance with one or more implementations as described herein.

FIGS. 8-10 illustrate example methods for rollable screen device thermal mitigation in accordance with one or more implementations of the techniques described herein.

DETAILED DESCRIPTION

Figure 1:
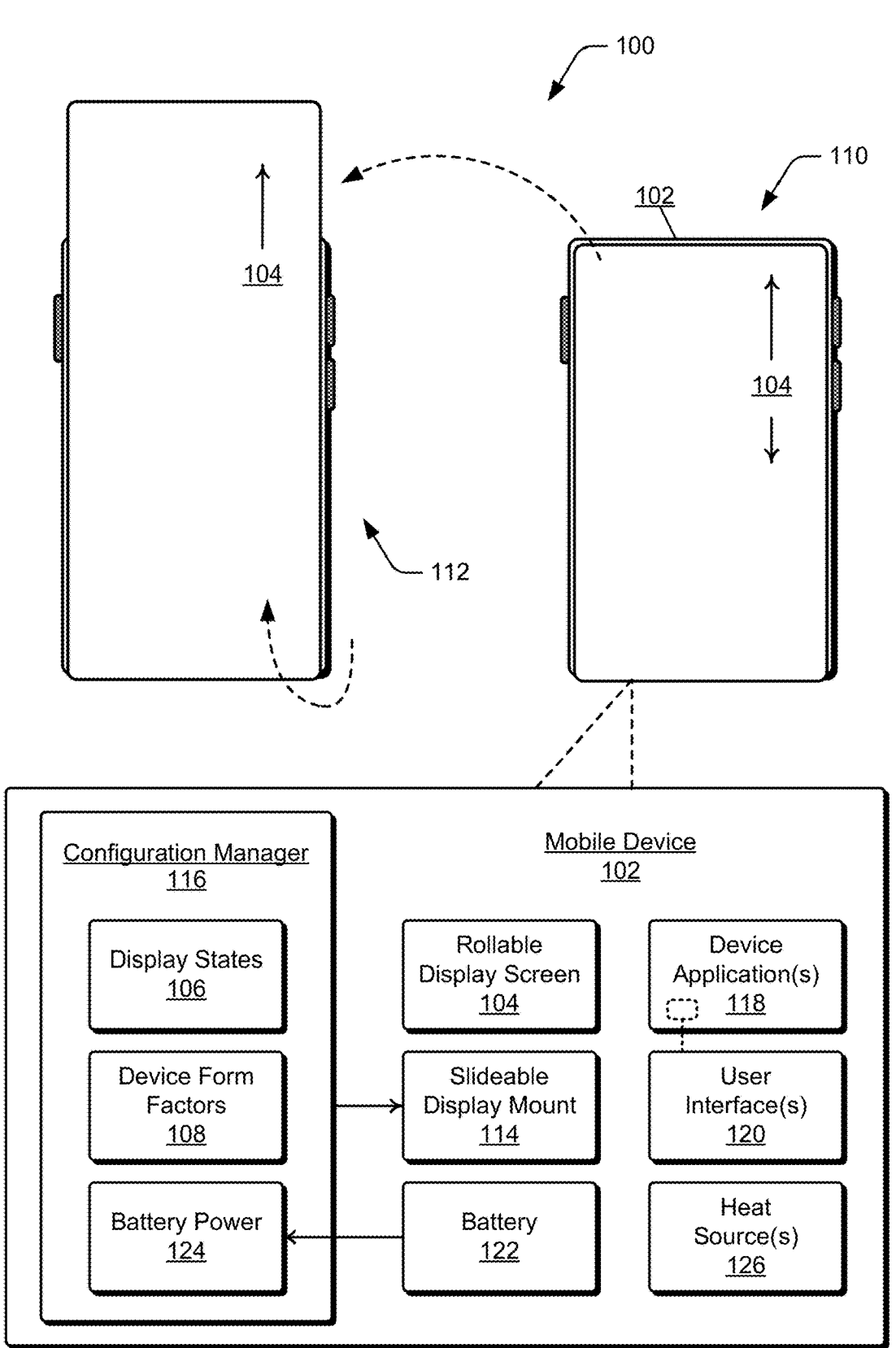
FIG. 1 illustrates an example system for rollable screen device thermal mitigation in accordance with one or more implementations as described herein.

Implementations of techniques for rollable screen device thermal mitigation are described herein, and the techniques apply to any device that is configurable in at least two form factors, such as any type of extendable device or foldable device (e.g., a flip-phone), either of which can change form factors automatically, or manually by a user of the device. A rollable screen device, such as a mobile device (e.g., any type of mobile phone, wireless device, and/or electronic device) is expandable with the rollable display screen that is configurable in one of multiple display states corresponding to respective device form factors. Aspects of the techniques described in this disclosure leverage the expandable capability of devices, such as to control heat dissipation based on device form factor and for thermal mitigation of the heat generated by device electronics within a device Generally, a mobile device (e.g., to include an extendable device or a foldable device) includes one or more heat sources that generate heat within the device. A device battery is an example of a heat source that typically generates heat within the device while charging. Any number of other electronic and/or computing devices include components as heat sources that generate heat within a device, such as a charging manager and/or power manager integrated circuit, a graphics processing unit, a CPU, a display device, device electronics, printed circuit boards, and any other type of component that utilizes device power and generates heat within the device.

In aspects of rollable screen device thermal mitigation, a mobile device implements a configuration manager as any type of control unit that can initiate expanding the mobile device from a compact form factor to an expanded form factor based on detecting any one of a thermal load, a device temperature, or a device component temperature. As noted, the techniques described herein apply to any device that is configurable in at least two form factors. The configuration manager can detect the heat generated within the mobile device, and initiate expanding the device based on the detection of the heat. Alternatively or in addition, the configuration manager can detect charging the battery of a mobile device (or a battery charger connected to the device), and initiate expanding the device based on the detection of battery charging (or the battery charger connected). For a different type of mobile device, such as a flip-phone that is expanded manually (e.g., opened by a user of the device), the configuration manager can initiate expanding the flip-phone device by displaying a user interface message to direct the manual expansion of the device, such as by instructing the user to open the flip-phone for heat dissipation and thermal mitigation.

Notably, to prevent damaging a device if it were to be automatically expanded from an unsafe position, such as if the device has been placed near the edge of a table, or if the device is in use or moving, the configuration manager is also implemented to determine from one or more sensor inputs that the mobile device is stationary before initiating to expand the mobile device from the compact form factor to the expanded form factor. In implementations, a mobile device can include one or more proximity sensors that detect whether the device is stationary and/or in a safe position to be expanded, so that the device does not fall from where it is placed and/or is not damaged while expanding. In similar implementations, the configuration manager determines both that the mobile device is stationary and charging the battery of the device (or a battery charger is connected) before initiating to expand the mobile device from the compact form factor to the expanded form factor.

While features and concepts of the described techniques for rollable screen device thermal mitigation can be implemented in any number of different devices, systems, environments, and/or configurations, implementations of the techniques for rollable screen device thermal mitigation are described in the context of the following example devices, systems, and methods.

FIG. 1 illustrates an example system 100 for rollable screen device thermal mitigation, as described herein. The example system 100 includes a mobile device 102, such as a smartphone, mobile phone, wireless device, and/or any other type of wireless device. The mobile device 102 can be implemented with various components, such as a processor system and memory, as well as any number and combination of different components as further described with reference to the example device shown in FIG. 11. In implementations, the mobile device 102 includes various radios for wireless communication with other devices. For example, the mobile device 102 may include a Bluetooth (BT) and/or Bluetooth Low Energy (BLE) transceiver and/or a near field communication (NFC) transceiver. The mobile device 102 may also include a Wi-Fi radio, a GPS radio, and/or any type of device communication interfaces.

The mobile device 102 has a rollable display screen 104 that can be configured in any one of various display states 106 corresponding to respective mobile device form factors 108. For example, the device form factors 108 can include a compact form factor, an expanded form factor, a partial form factor (also referred to as a "peek" form factor), as well as other device form factors. The rollable display screen 104 may be positioned in any incremental display state 106 corresponding to device form factors between the compact form factor and the expanded form factor. In this example system 100, the mobile device 102 is shown in the compact form factor at 110, with the rollable display screen 104 configured in a retracted display state that corresponds to the compact form factor of the device. Further, the mobile device 102 is shown in the expanded form factor at 112, with the rollable display screen 104 configured in an extended display state. The rollable display screen 104 is a flexible display that translates between the retracted display state to the extended display state, and back. In one or more implementations, the rollable display screen 104 is an organic light emitting diode (OLED) display fabricated on a flexible plastic substrate, which allows the flexible display to deform around the device housing.

The mobile device 102 includes a slidable display mount 114 that is a powered sliding or translation mechanism (e.g., an actuator, motor, gear assembly, drive screws, etc.) operable to transition the rollable display screen 104 around the surfaces of the device housing, such as between the extended display state where the rollable display screen 104 extends distally from the device housing, and the retracted display state where the rollable display screen 104 corresponds to the compact form factor of the device with the flexible display wrapping around the surfaces of the device housing. In one or more implementations, the rollable display screen 104 may be extended or retracted automatically, such as based on whether content is being displayed on the display screen for viewing, a size of the displayed content, and/or based on the type of displayed content. For example, a user may prefer the mobile device 102 in the compact form factor as shown at 110 for ease of carrying, and then when initiating to playback content for viewing, the rollable display screen 104 automatically extends from the retracted display state to the extended display state for full-screen viewing, as shown at 112 in the expanded form factor of the device.

The mobile device 102 includes various functionality that enables the mobile device to implement different aspects of rollable screen device thermal mitigation, as described herein. In this example system 100, the mobile device 102 includes a configuration manager 116 that represents functionality (e.g., logic, software, and/or hardware) enabling the automatic function control of the slidable display mount 114 for translating and positioning the rollable display screen 104. The configuration manager 116 can be implemented as computer instructions stored on computer-readable storage media (e.g., memory of the device), or in any other suitable memory device or electronic data storage, and can be executed by a processor system of the device. Alternatively or in addition, the configuration manager 116 can be implemented at least partially in firmware and/or at least partially in computer hardware. For example, at least part of the configuration manager 116 may be executable by a computer processor, and/or at least part of the configuration manager may be implemented in logic circuitry. In one or more implementations, the configuration manager 116 may include independent processing, memory, and/or logic components functioning as a computing and/or electronic device integrated with the mobile device 102.

The mobile device 102 can include and implement various device applications 118, such as any type of messaging application, email application, video communication application, cellular communication application, music application, gaming application, media application, social platform applications, and/or any other of the many possible types of device applications. Many of the device applications 118 have an associated application user interface 120 that is generated and displayed for user interaction and viewing, such as on the rollable display screen 104 of the mobile device 102. Generally, an application user interface, or any other type of video, image, graphic, and the like is digital image content that is displayable on the rollable display screen 104 of the mobile device. In this example system 100, the configuration manager 116 can be implemented as a software application or module, such as executable software instructions that are executable with a processor system of the mobile device 102 to implement the techniques and features described herein. As a device application, the configuration manager 116 may have an associated application user interface 120 that is generated and displayable for user interaction and viewing, such as on the rollable display screen 104 of the mobile device.

The rollable display screen 104 can be utilized to display any of various types of content on the mobile device 102. In one or more implementations, the mobile device 102 generates and/or outputs content from a device application 118 and/or operating system of the device, and the content is displayed on the rollable display screen 104. For example, a media application may receive streaming content from a remote server via a communication network for display on the rollable display screen.

Any of the devices, applications, modules, servers, and/or services described herein can communicate via a communication network, such as for data communication between the mobile device 102 and other communication and/or computing devices. The communication network can be implemented to include a wired and/or a wireless network, may be implemented using any type of network topology and/or communication protocol, and can be represented or otherwise implemented as a combination of two or more networks, to include IP-based networks and/or the Internet. The communication network may also include mobile operator networks that are managed by a mobile network operator and/or other network operators, such as a communication service provider, mobile phone provider, and/or Internet service provider.

In this example system 100, the mobile device 102 also includes a battery 122 or any other type of similar power source, such as described with reference to the example device shown in FIG. 11, to power features of the mobile device, including the slidable display mount 114 that is the powered sliding or translation mechanism operable to transition the rollable display screen 104 around the surfaces of the device housing. In one or more implementations, the configuration manager 116 can receive an indication of battery power 124, such as an indication of battery usage of the battery 122, remaining battery power of the battery, an indication of low battery power, and/or whether the device is plugged into an external power source and the battery is charging.

In one or more implementations, the mobile device 102 may also be configured in other device form factors 108, such as a partial form factor, which is further shown and described with reference to FIG. 2. As noted above, the partial form factor may also be referred to as a "peek" form factor, and in this configuration, the rollable display screen 104 translates down (e.g., in an opposite direction of the extended display state). This display state provides for an unobstructed sensory view of various device sensors and/or components that are otherwise hidden behind the rollable display screen 104 in both the compact form factor (retracted display state) and expanded form factor (extended display state). For example, sensors such as a front-facing camera, environment sensors (e.g., for motion, sound, lighting, etc.), a proximity sensor, and/or a phone earpiece speaker can all be integrated in the mobile device 102 under the rollable display screen 104, and the slidable display mount 114 translates the display screen over or above the sensors. These under-the-display screen sensors are then exposed or visible for use in the sensor display state of the rollable display screen 104, which corresponds to the partial form factor of the mobile device 102.

In implementations, the configuration manager 116 can initiate to configure the mobile device 102 in the partial form factor corresponding to the sensor display state of the rollable display screen 104 when an incoming voice call will require user access to the phone earpiece speaker, or when the front-facing camera is needed for image capture. Although generally described throughout this disclosure as the configuration manager 116 initiating and/or automatically controlling the configuration and/or reconfiguration of the mobile device form factors 108, a user of the device may initiate to configure the device in any form factor and/or display state of the rollable display screen, and override configuration settings of the configuration manager.

In one or more implementations, a portion of the rollable display screen 104 rotates around the housing of the mobile device 102, such as in the compact form factor of the device, forming a rear-facing portion of the display screen (e.g., relative to the front-facing portion of the display screen shown in the compact form factor at 110 and in the expanded form factor at 112 in the example system 100). In implementations, both the front-facing portion and the rear-facing portion of the rollable display screen 104 can be used to display content, such as related content or content associated with two different applications. In the expanded form factor of the mobile device 102, the rear-facing portion of the rollable display screen 104 rotates around the device housing and becomes part of the front-facing portion of the display screen. Notably, the viewable display area of the rollable display screen 104 varies as the display screen is translated from the sensor display state to the retracted display state to the extended display state, and back.

In aspects of the techniques described herein for rollable screen device thermal mitigation, the mobile device 102 includes one or more heat sources 126 that generate heat within the device. The device battery 122 is an example of a heat source 126 that typically generates heat within the device while charging. As further described with reference to FIG. 6, any number of electronic and/or computing devices include components as heat sources that generate heat within a device, such as a charging and/or power manager integrated circuit, a graphics processing unit, a CPU, a display device, device electronics, printed circuit boards, and any other type of component that utilizes device power and generates heat within the device.

In one or more implementations of the techniques described herein for rollable screen device thermal mitigation, the configuration manager 116 can initiate expanding the mobile device 102 from the compact form factor (shown at 110) to the expanded form factor (shown at 112) based on any one of a thermal load, a device temperature, or a device component temperature. Notably the techniques described herein apply to any device that is configurable in at least two form factors, such as any type of extendable device or foldable device (e.g., a flip-phone), either of which can change form factors automatically, or manually by a user of the device. In this example system 100 of the mobile device 102, the device is expandable with the rollable display screen 104 configurable in one of multiple display states corresponding to respective device form factors.

In one or more implementations, the configuration manager 116 can detect the heat generated within the mobile device 102, and initiate expanding the mobile device based on the detection of the heat. Alternatively or in addition, the configuration manager 116 can detect charging the battery 122 of the mobile device (or a battery charger connected to the device), and initiate expanding the mobile device based on the detection of battery charging (or the battery charger connected). As described above, the slidable display mount 114 is operable to extend the rollable display screen corresponding to the expanded form factor of the device, or retract the rollable display screen corresponding to the compact form factor of the device. For a different type of mobile device, such as a flip-phone that is expanded manually (e.g., opened by a user of the device), the configuration manager 116 can initiate expanding the flip-phone device by displaying a user interface message to direct the manual expansion of the device, such as by instructing the user to open the flip-phone for heat dissipation and thermal mitigation.

The configuration manager 116 can initiate operation of the slidable display mount 114 to expand the mobile device 102 from the compact form factor of the device to the expanded form factor of the device. As further shown and described with reference to FIG. 6, an expansion of the device (e.g., from the compact form factor at 110 to the expanded form factor at 112) can be utilized to increase the relative distance between heat sources 126 in the device, which facilitates thermal mitigation of the heat that is generated by the components in the device. Further, the overall surface area of the mobile device 102 contributes to heat dissipation, and the expansion of the device increases the surface area and the dissipation of the heat. Not only does setting apart the internal device heat sources when the device is expanded provide for thermal mitigation, but increasing the surface area of the device by the device expansion also dissipates and/or transfers the generated heat for thermal mitigation.

Notably, to prevent damaging the mobile device 102 if it were to be automatically expanded from an unsafe position, such as if the device has been placed near the edge of a table, or if the device is in use or moving, the configuration manager 116 is implemented to determine from one or more sensor inputs that the mobile device 102 is stationary before initiating to expand the mobile device from the compact form factor to the expanded form factor. In implementations, the mobile device 102 can include one or more proximity sensors that detect whether the device is stationary and/or in a safe position to be expanded, so that the device does not fall from where it is placed and/or is not damaged while expanding. In similar implementations, the configuration manager 116 determines both that the mobile device 102 is stationary and charging the battery 122 of the device (or a battery charger is connected) before initiating to expand the mobile device from the compact form factor to the expanded form factor.

In implementations, the configuration manager 116 can also detect an end of the battery charging, or the battery charger disconnected from the device, and initiate contracting the mobile device from the expanded form factor at 112 back to the compact form factor at 110 based on the end of the battery charging and previous expanding of the mobile device. An implementation of this aspect of the rollable screen device thermal mitigation is further shown and described with reference to FIG. 7.

FIG. 2 further illustrates example views 200 of the mobile device in aspects of rollable screen device thermal mitigation, as described herein. In these example views 200, the mobile device 102 is shown in a front view 202 in the partial form factor (e.g., also referred to as the "peek" form factor), with the rollable display screen 104 configured in the sensor display state. In this configuration, the rollable display screen 104 translates down (e.g., in an opposite direction of the extended display state). This sensor display state provides for an unobstructed sensory view of various device sensors 204 and/or components that are otherwise hidden behind the rollable display screen 104 in both the compact form factor (retracted display state) and expanded form factor (extended display state). For example, the device sensors 204, such as a front-facing camera, environment sensors (e.g., for motion, sound, lighting, etc.), a proximity sensor, and/or phone earpiece speaker can all be integrated in the mobile device 102 under the rollable display screen 104, and the slidable display mount 114 translates the display screen over or above the sensors. These under-the-display screen sensors are then exposed or visible for use in the sensor display state of the rollable display screen 104 that corresponds to the partial form factor of the mobile device 102. In these example views 200, the mobile device 102 is also shown in a back view 206 in the partial form factor of the device, with the rollable display screen 104 configured in the sensor display state. The rollable display screen 104 is translated by the slidable display mount 114 around the device housing, and forms the rear-facing portion of the display screen.

Figure 3:
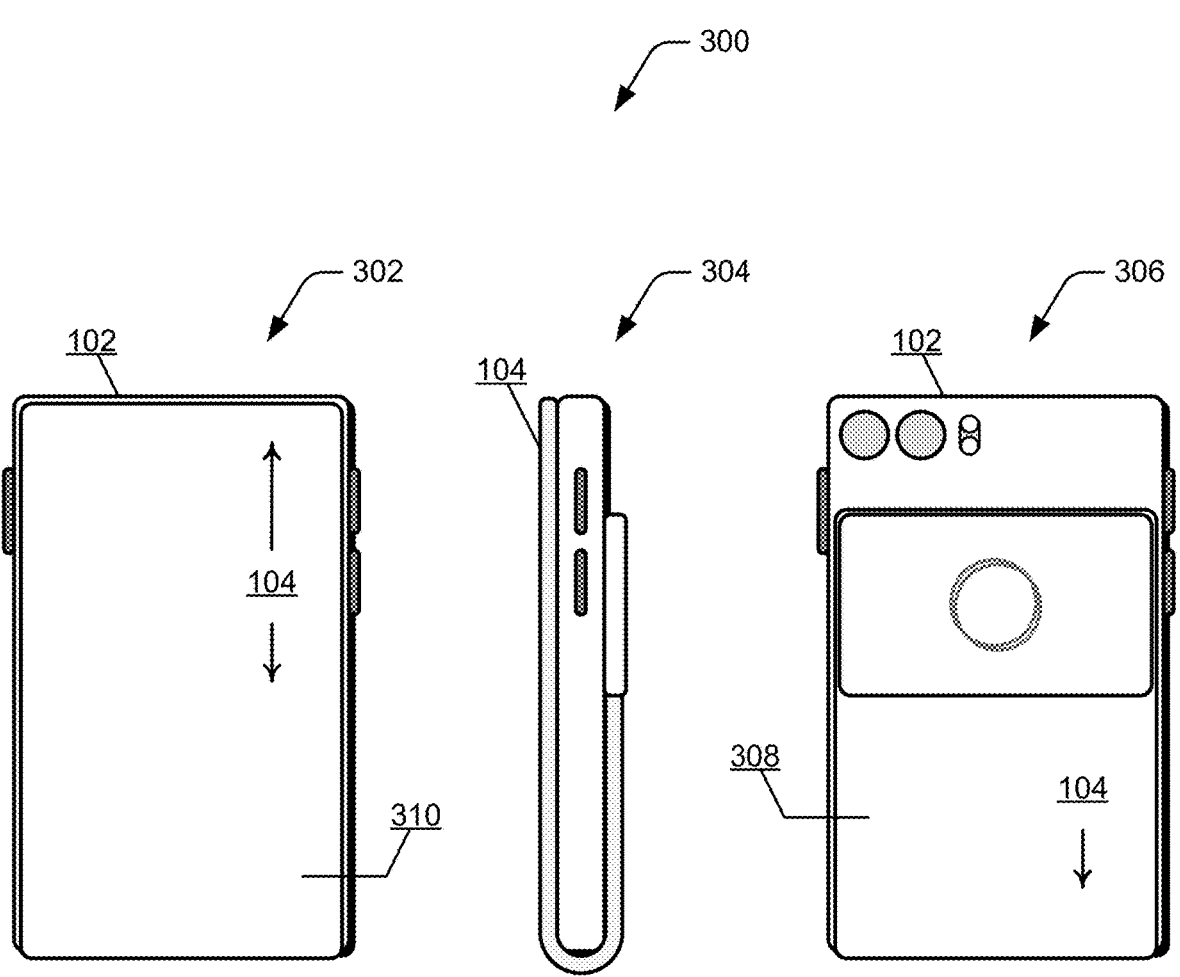
FIG. 3 further illustrates example views of the mobile device, which supports rollable screen device thermal mitigation in accordance with one or more implementations as described herein.

FIG. 3 further illustrates example views 300 of the mobile device in aspects of rollable screen device thermal mitigation, as described herein. In these example views 300, the mobile device 102 is shown in a front view 302, a side view 304, and a back view 306 in the compact form factor, with the rollable display screen 104 configured in the retracted display state. In this configuration, a portion of the rollable display screen 104 rotates around the housing of the mobile device 102, forming a rear-facing portion 308 of the display screen (e.g., relative to the front-facing portion 310 of the display screen). In implementations, both the front-facing portion 310 and the rear-facing portion 308 of the rollable display screen 104 can be used to display content, such as related content or content associated with different applications.

Figure 4:
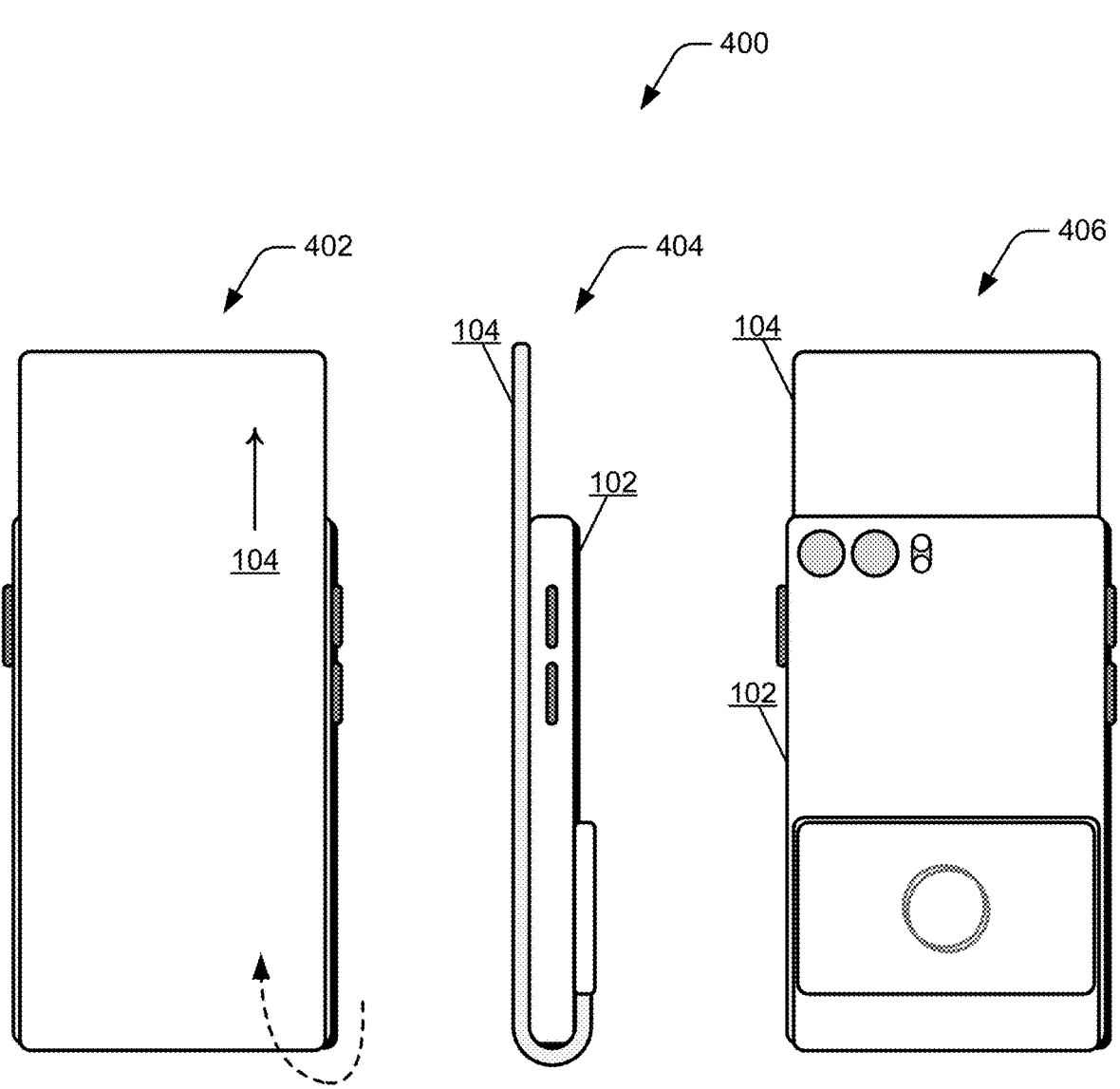
FIG. 4 further illustrates example views of the mobile device, which supports rollable screen device thermal mitigation in accordance with one or more implementations as described herein.

FIG. 4 further illustrates example views 400 of the mobile device in aspects of rollable screen device thermal mitigation, as described herein. In these example views 400, the mobile device 102 is shown in a front view 402, a side view 404, and a back view 406 in the expanded form factor, with the rollable display screen 104 configured in the extended display state. In this configuration, the rear-facing portion of the rollable display screen 104 rotates around the device housing and becomes part of the front-facing portion of the display screen. Notably, the viewable display area of the rollable display screen 104 varies as the display screen is translated from the sensor display state to the retracted display state to the extended display state, and back.

As illustrated in the figures, the slidable display mount 114 translates the rollable display screen 104 around the device housing to change the overall length of the flexible display as viewed from the front of the mobile device 102 (e.g., as shown in the front view 402). The slidable display mount 114 also translates the rollable display screen 104 in an opposite direction around the device housing to the retracted display state in the compact form factor of the device, and more of the rollable display screen 104 is viewable as the rear-facing portion of the display. Content, such as any type of graphics and images, can be displayed on any section of the rollable display screen 104, including on the front-facing portion, on the rear-facing portion, and/or on the curved end portion of the display screen.

Figure 5:
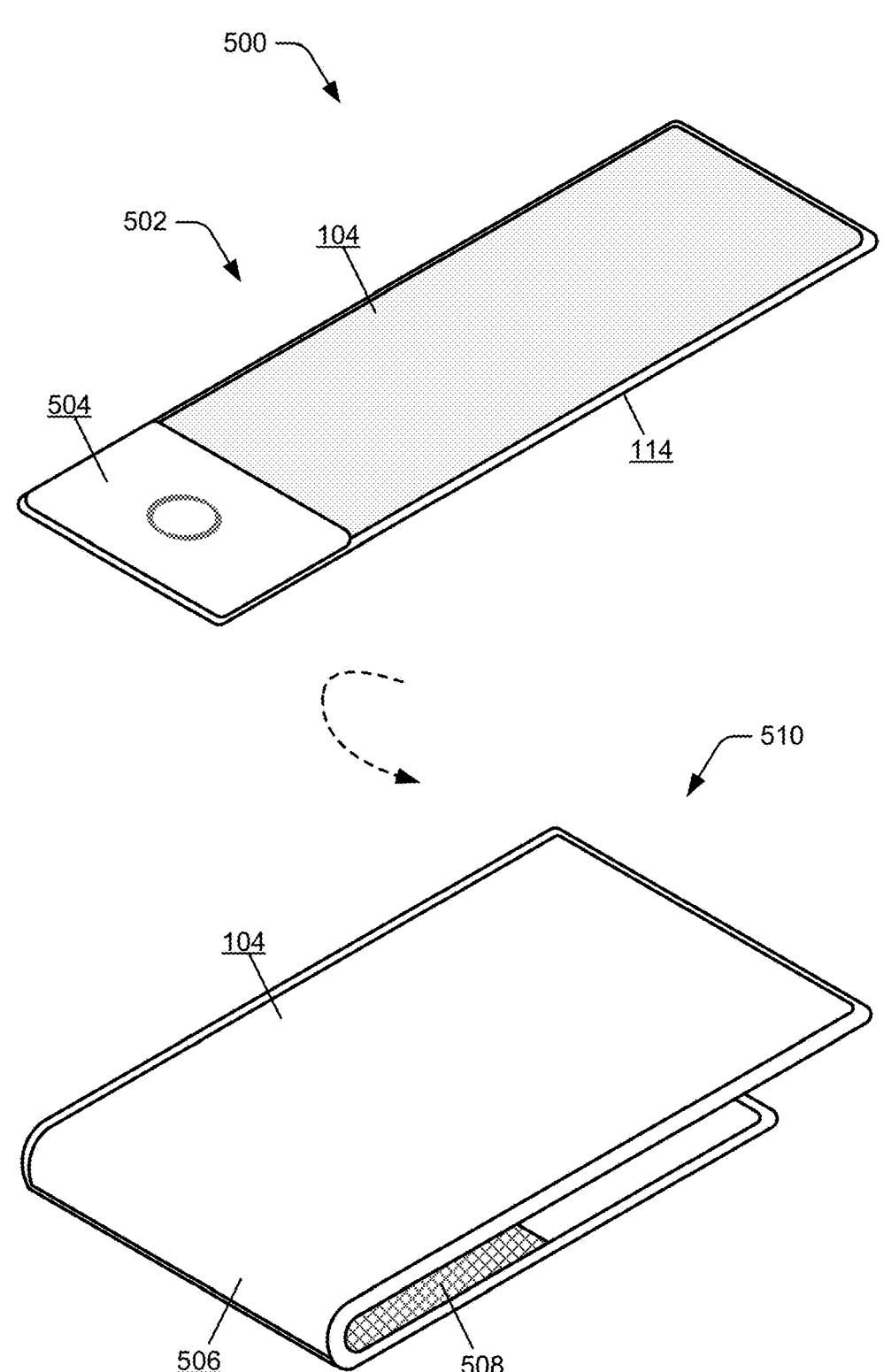
FIG. 5 illustrates example views of a rollable display screen and mounting assembly, which supports rollable screen device thermal mitigation in accordance with one or more implementations as described herein.

FIG. 5 illustrates example views 500 of the rollable display screen and the slidable display mount of the mobile device in aspects of rollable screen device thermal mitigation, as described herein. In these example views 500, the rollable display screen 104 integrated with the slidable display mount 114 is shown configured at 502, along with a backplate 504. A display roller mechanism can be implemented to facilitate the flexible display and mounting assembly (e.g., the rollable display screen 104 and the slidable display mount 114) wrapping around the device housing. The display roller mechanism includes a rotor positioned within the curvilinear section 506 of the flexible display and mounting assembly to facilitate translation of the rollable display screen 104 in the various display states. In one or more implementations, the slidable display mount 114 includes a substrate that includes a flexible portion 508, which allows the flexible display and mounting assembly to wrap and deform around the device housing. As shown at 510, the rollable display screen 104 and the slidable display mount 114 are wrapped around to form the curvilinear section 506 of the flexible display, along with two linear sections of the display as the front-facing portion and the rear-facing portion of the rollable display screen. As shown in the example views 500, a cross section of the rollable display screen 104 and the slidable display mount 114 forms a J-shape or U-shape with the curvilinear section 506 of the display.

Figure 6:
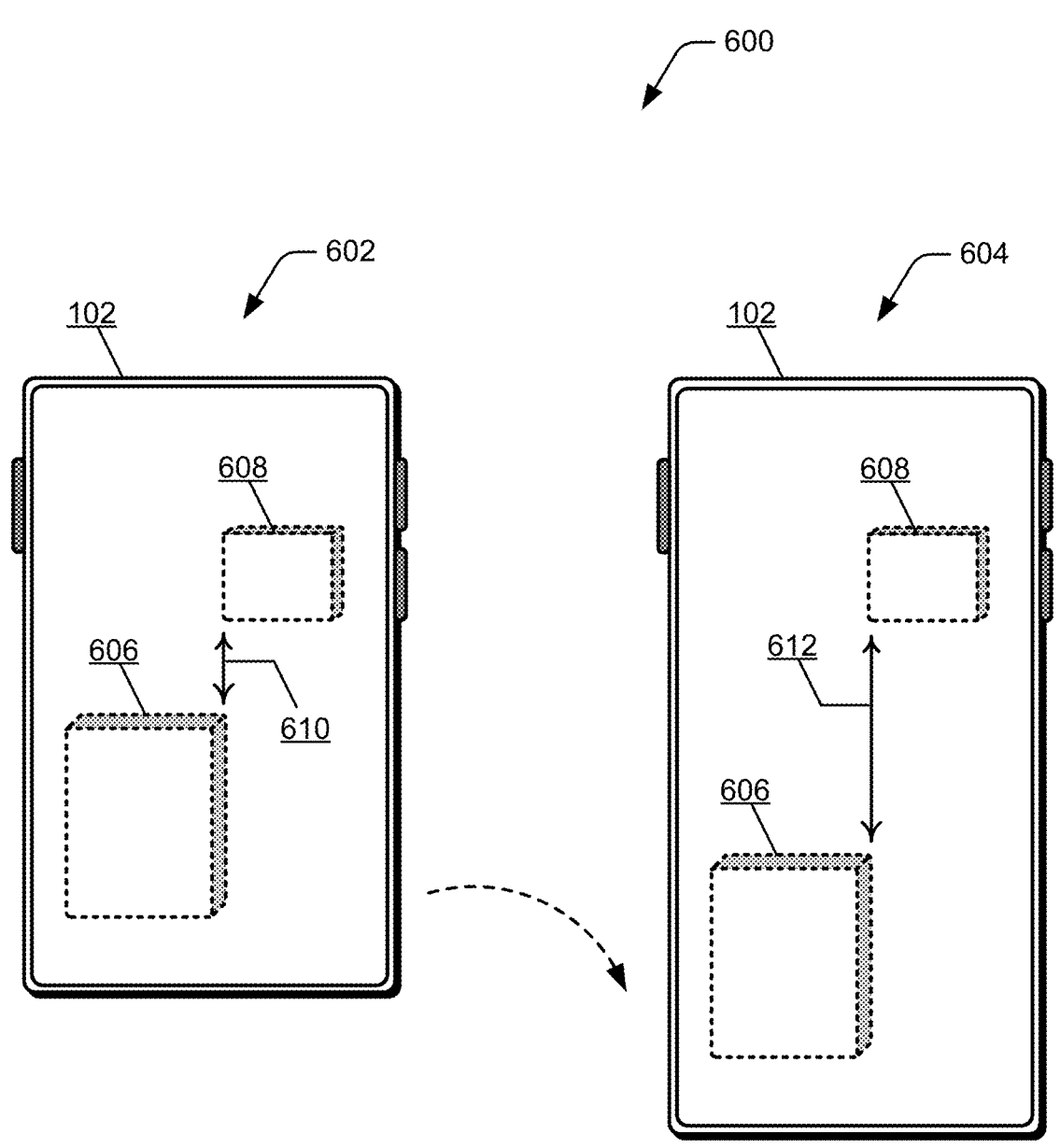
FIG. 6 illustrates an example of mobile device expansion, which supports rollable screen device thermal mitigation in accordance with one or more implementations as described herein.

FIG. 6 further illustrates an example 600 of the mobile device in aspects of rollable screen device thermal mitigation, as described herein. In this example 600, the mobile device 102 is generally shown in a compact form factor at 602 and in an expanded form factor at 604. Notably the techniques described herein apply to any device that is configurable in at least two form factors, such as any type of extendable device or foldable device (e.g., a flip-phone), either of which can change form factors automatically, or manually by a user of the device. In this example 600, the mobile device 102 includes a heat source 606, such as the device battery 122 that typically generates heat within the device while charging. The mobile device 102 also includes at least one additional heat source 608, such as a charging and/or power manager integrated circuit. Although only two heat sources are shown and described in the mobile device 102 in this example 600, many electronic and/or computing devices include more than two components as heat sources that generate heat within a device.

In this example 600, both the heat source 606 and the additional heat source 608 generate heat within the mobile device. In aspects of the techniques described herein for rollable screen device thermal mitigation, an expansion of the device (e.g., from the compact form factor at 602 to the expanded form factor at 604) increases a distance between the heat sources. For example, a relative distance 610 between the heat source 606 and the additional heat source 608 (at 602) is increased to a relative distance 612 (at 604), which facilitates thermal mitigation of the heat that is generated by the components in the device. Further, the overall surface area of the mobile device 102 contributes to heat dissipation, and the expansion of the device increases the surface area and the dissipation of the heat. Not only does setting apart the internal device heat sources when the device is expanded provide for thermal mitigation, but increasing the surface area of the device by the device expansion also dissipates and/or transfers the generated heat for thermal mitigation.

Example methods 700, 800, 900, and 1000 are described with reference to respective FIGS. 7-10 in accordance with one or more implementations for rollable screen device thermal mitigation, as described herein. Generally, any services, components, modules, managers, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 7:
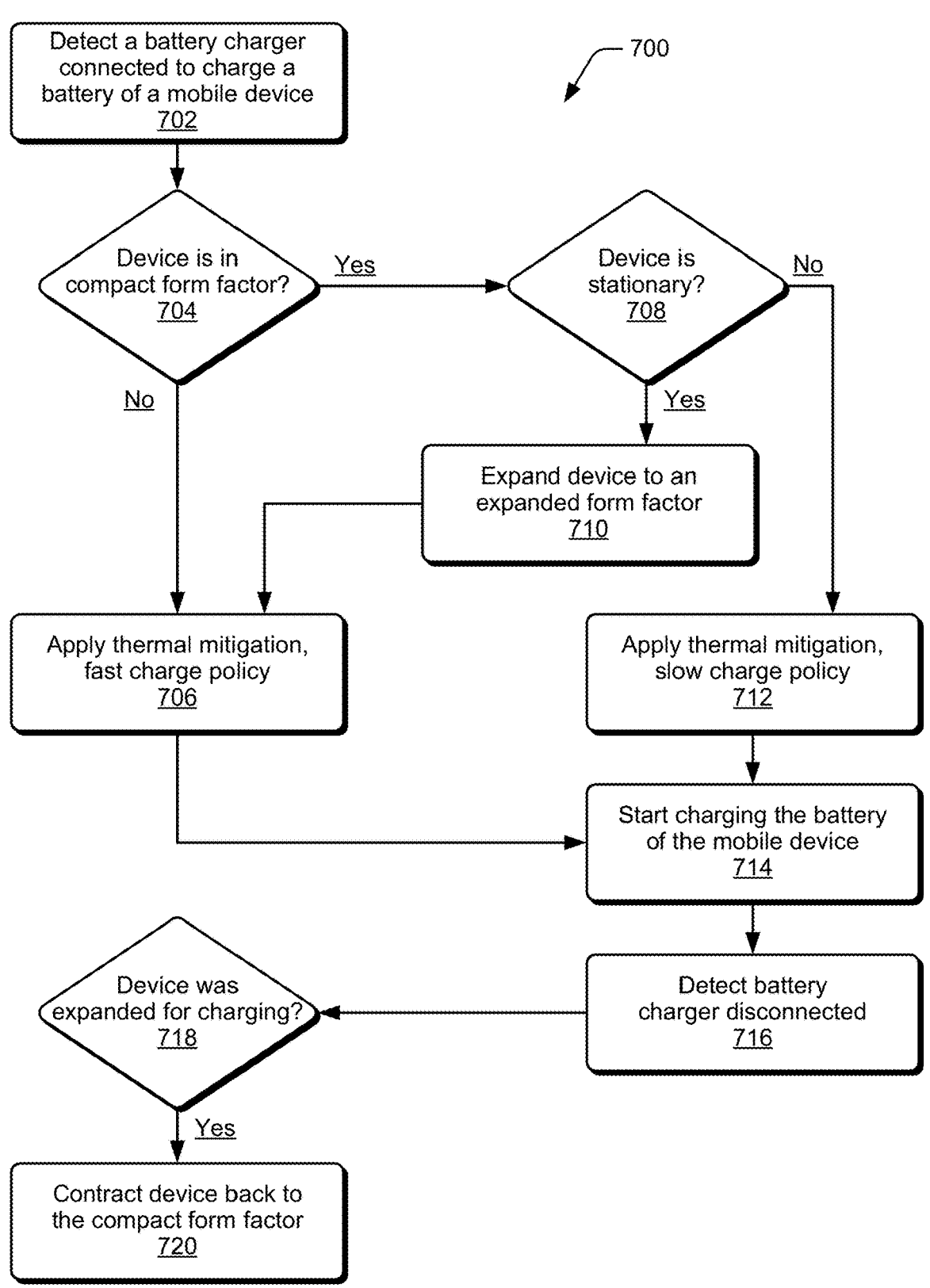
FIG. 7 illustrates an example method of device thermal mitigation, which supports rollable screen device thermal mitigation in accordance with one or more implementations as described herein.

FIG. 7 illustrates example method(s) 700 for rollable screen device thermal mitigation. The order in which the method is described is not intended to be construed as a limitation, and any number or combination of the described method operations can be performed in any order to perform a method, or an alternate method.

At 702, a battery charger connected to charge a battery of a mobile device is detected. For example, the configuration manager 116 detects a battery charger connected to charge the device battery 122 of the mobile device 102. At 704, a determination is made as to whether the device is configured in a compact form factor. For example, the configuration manager 116 determines the configuration of the mobile device 102 as being in one of the compact form factor or in the expanded form factor.

If the device is not configured in the compact form factor (i.e., "No" from 704), then the device is in the expanded form factor and at 706, a thermal mitigation, fast charge policy is applied. For example, the configuration manager 116 initiates the thermal mitigation, fast charge policy, which likely generates relatively more heat while the device battery 122 is charging, because the device can dissipate more heat for thermal mitigation in the expanded form factor. If the device is configured in the compact form factor (i.e., "Yes" from 704), then at 708, a determination is made as to whether the device is stationary. For example, the configuration manager 116 determines, such as based on one or more proximity sensors input, whether the mobile device 102 is stationary and/or in a safe position to be expanded before initiating to expand the mobile device from the compact form factor to the expanded form factor.

If the device is stationary (i.e., "Yes" from 708), then at 710, the device is expanded to the expanded form factor, and at 706, the thermal mitigation, fast charge policy is applied. If the device is not stationary (i.e., "No" from 708), then at 712, a thermal mitigation, slow charge policy is applied. A thermal mitigation technique to help cool the device is to reduce the charge current, which results in slower charging and a longer charging time, but generates relatively less heat within the device.

At 714, the battery of the mobile device starts charging based on either application of the thermal mitigation, fast charge policy (at 706) or the thermal mitigation, slow charge policy (at 712). At 716, the battery charger being disconnected from the mobile device is detected. At 718, a determination is made as to whether the device was previously expanded for charging. For example, the configuration manager 116 determines whether the mobile device 102 was expanded to the expanded form factor (e.g., at 710). If the mobile device was expanded for charging (i.e., "Yes" from 718), then at 720, the device is contracted back to the compact form factor.

FIG. 8 illustrates example method(s) 800 for rollable screen device thermal mitigation. The order in which the method is described is not intended to be construed as a limitation, and any number or combination of the described method operations can be performed in any order to perform a method, or an alternate method.

At 802, heat is generated within a mobile device from at least one heat source. For example, the mobile device 102 includes a heat source 126, such as the device battery 122 that typically generates heat within the device while charging. In one or more implementations, the mobile device may be a foldable mobile device (e.g., a flip phone), or an expandable mobile device with a rollable display screen configurable in one of multiple display states corresponding to respective device form factors. At 804, the heat that is generated is detected within the mobile device. For example, the configuration manager 116 detects the heat that is generated within the mobile device 102, such with device sensors.

At 806, a determination is made, from one or more sensor inputs, that the mobile device is stationary before expansion of the mobile device from a compact form factor to an expanded form factor. For example, the configuration manager 116 determines from one or more sensor inputs that the mobile device 102 is stationary before initiating to expand the mobile device from the compact form factor to the expanded form factor. In implementations, the mobile device 102 includes one or more proximity sensors that detect whether the device is stationary and/or in a safe position to be expanded, so that the device does not fall from where it is placed and/or is not damaged while expanding.

At 808, the mobile device is expanded from a compact form factor to an expanded form factor based on one of a thermal load, a device temperature, or a device component temperature. For example, the configuration manager 116 initiates operation of the slidable display mount 114 to expand the mobile device 102 from the compact form factor of the device to the expanded form factor of the device. An expansion of the device (e.g., from the compact form factor at 110 to the expanded form factor at 112) can be utilized to increase the relative distance between heat sources 126 in the device, which facilitates thermal mitigation of the heat that is generated by the components in the device. Further, the overall surface area of the mobile device 102 contributes to heat dissipation, and the expansion of the device increases the surface area and the dissipation of the heat. In implementations, the mobile device is expanded based on detection of the heat.

FIG. 9 illustrates example method(s) 900 for rollable screen device thermal mitigation. The order in which the method is described is not intended to be construed as a limitation, and any number or combination of the described method operations can be performed in any order to perform a method, or an alternate method.

At 902, charging a battery of a mobile device is detected. For example, the configuration manager 116 detects charging the battery 122 of the mobile device 102 (or a battery charger connected to the device), which can generate heat within the mobile device.

At 904, a determination is made that the mobile device is stationary and charging a battery of the mobile device before expansion of the mobile device from a compact form factor to an expanded form factor. For example, the configuration manager 116 determines from one or more sensor inputs that the mobile device 102 is stationary and charging the device battery 122 (or a battery charger is connected to the device) before initiating to expand the mobile device from the compact form factor to the expanded form factor. In implementations, the mobile device 102 includes one or more proximity sensors that detect whether the device is stationary and/or in a safe position to be expanded, so that the device does not fall from where it is placed and/or is not damaged while expanding.

At 906, the mobile device is expanded from a compact form factor to an expanded form factor based on one of a thermal load, a device temperature, or a device component temperature. For example, the configuration manager initiates to expand the mobile device 102 based on the detection of the battery charging (or the battery charger connected to the device). For example, the configuration manager 116 initiates operation of the slidable display mount 114 to expand the mobile device 102 from the compact form factor of the device to the expanded form factor of the device, which facilitates thermal mitigation of the heat that is generated by the battery charging in the device.

At 908, an end of the battery charging is detected, and at 910, the mobile device is contracted from the expanded form factor to the compact form factor based on the end of the charging the battery and previous expanding of the mobile device. For example, the configuration manager 116 also detects an end of the battery charging, or the battery charger disconnected from the device, and initiates contracting the mobile device from the expanded form factor at 112 back to the compact form factor at 110 based on the end of the battery charging and previous expanding of the mobile device.

Figure 10:
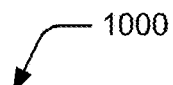

FIG. 10 illustrates example method(s) 1000 for rollable screen device thermal mitigation. The order in which the method is described is not intended to be construed as a limitation, and any number or combination of the described method operations can be performed in any order to perform a method, or an alternate method.

At 1002, heat is generated within a mobile device by a heat source. For example, the mobile device 102 includes a heat source 606, such as the device battery 122 that typically generates heat within the device while charging. At 1004, the heat is detected by a sensor as one of a thermal load, a device temperature, or a device component temperature. For example, the heat that is being generated in the mobile device 102 is detected, such as by one or more sensors in the device, and the heat is detected as one of a thermal load, a device temperature, or a device component temperature in the device.

At 1006, the mobile device is configured, by a control unit, for increased heat dissipation based on detection of the heat. For example, a control unit, such as the configuration manager 116 in one or more implementations, configures the mobile device 102 for increased heat dissipation, such as by expanding the device to increase relative distances between heat generating components in the device and/or to increase the surface area of the device, which also facilitates heat dissipation and thermal mitigation.

Figure 11:
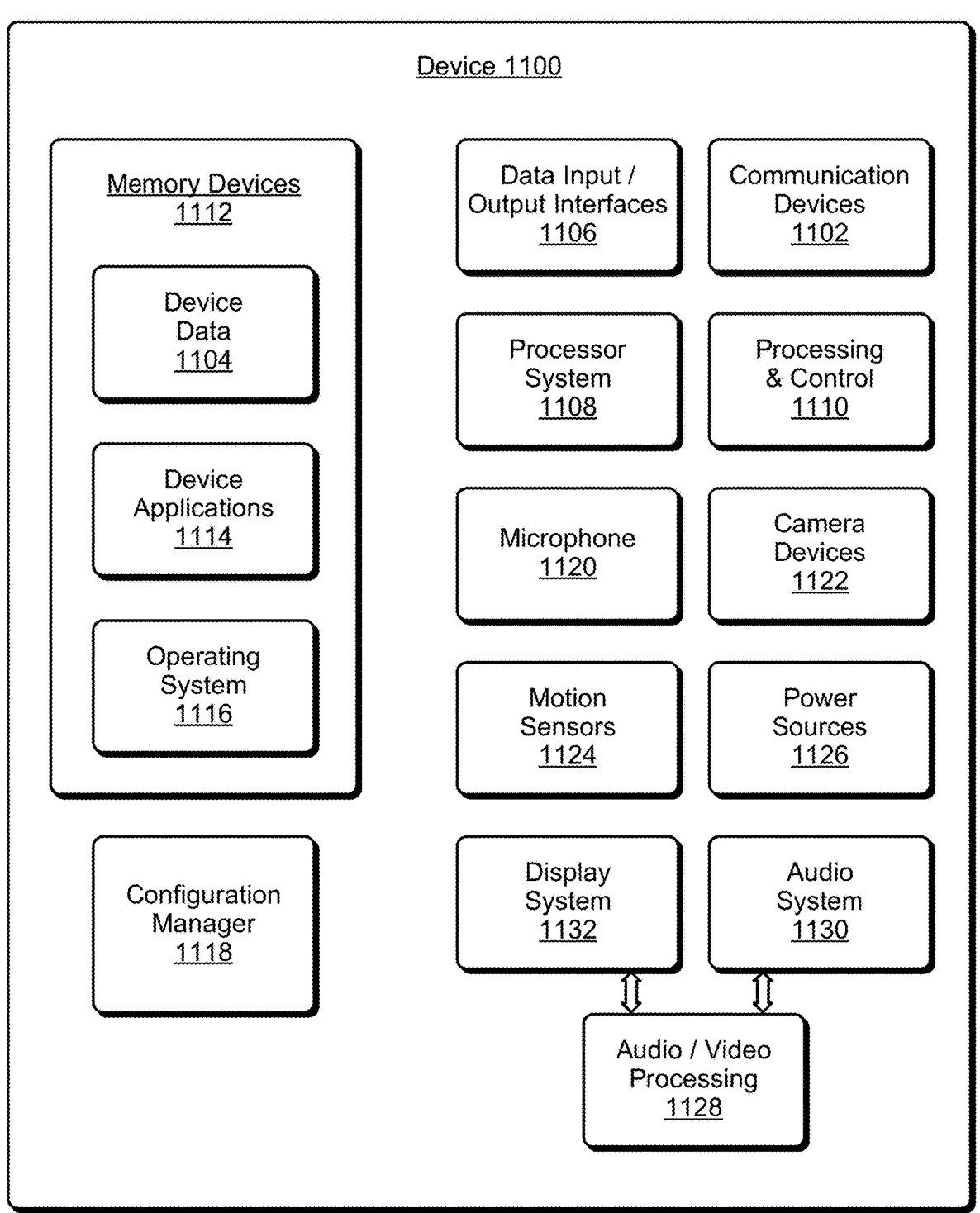
FIG. 11 illustrates various components of an example device that can be used to implement the techniques for rollable screen device thermal mitigation as described herein.

FIG. 11 illustrates various components of an example device 1100, which can implement aspects of the techniques and features for rollable screen device thermal mitigation, as described herein. The example device 1100 can be implemented as any of the devices described with reference to the previous FIGS. 1-10, such as any type of a wireless device, mobile device, mobile phone, flip phone, client device, companion device, paired device, display device, tablet, computing, communication, entertainment, gaming, media playback, and/or any other type of computing and/or electronic device. For example, the mobile device 102 described with reference to FIGS. 1-10 may be implemented as the example device 1100.

The example device 1100 can include various, different communication devices 1102 that enable wired and/or wireless communication of device data 1104 with other devices. The device data 1104 can include any of the various devices data and content that is generated, processed, determined, received, stored, and/or communicated from one computing device to another. Generally, the device data 1104 can include any form of audio, video, image, graphics, and/or electronic data that is generated by applications executing on a device. The communication devices 1102 can also include transceivers for cellular phone communication and/or for any type of network data communication.

The example device 1100 can also include various, different types of data input/output (I/O) interfaces 1106, such as data network interfaces that provide connection and/or communication links between the devices, data networks, and other devices. The I/O interfaces 1106 can be used to couple the device to any type of components, peripherals, and/or accessory devices, such as a computer input device that may be integrated with the example device 1100. The I/O interfaces 1106 may also include data input ports via which any type of data, information, media content, communications, messages, and/or inputs can be received, such as user inputs to the device, as well as any type of audio, video, image, graphics, and/or electronic data received from any content and/or data source.

The example device 1100 includes a processor system 1108 of one or more processors (e.g., any of microprocessors, controllers, and the like) and/or a processor and memory system implemented as a system-on-chip (SoC) that processes computer-executable instructions. The processor system 1108 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that may be implemented in connection with processing and control circuits, which are generally identified at 1110. The example device 1100 may also include any type of a system bus or other data and command transfer system that couples the various components within the device. A system bus can include any one or combination of different bus structures and architectures, as well as control and data lines.

The example device 1100 also includes memory and/or memory devices 1112 (e.g., computer-readable storage memory) that enable data storage, such as data storage devices implemented in hardware which can be accessed by a computing device, and that provide persistent storage of data and executable instructions (e.g., software applications, programs, functions, and the like). Examples of the memory devices 1112 include volatile memory and non-volatile memory, fixed and removable media devices, and any suitable memory device or electronic data storage that maintains data for computing device access. The memory devices 1112 can include various implementations of random-access memory (RAM), read-only memory (ROM), flash memory, and other types of storage media in various memory device configurations. The example device 1100 may also include a mass storage media device.

The memory devices 1112 (e.g., as computer-readable storage memory) provide data storage mechanisms, such as to store the device data 1104, other types of information and/or electronic data, and various device applications 1114 (e.g., software applications and/or modules). For example, an operating system 1116 can be maintained as software instructions with a memory device 1112 and executed by the processor system 1108 as a software application. The device applications 1114 may also include a device manager, such as any form of a control application, software application, signal-processing and control module, code that is specific to a particular device, a hardware abstraction layer for a particular device, and so on.

In this example, the device 1100 includes a configuration manager 1118 that implements various aspects of the described features and techniques described herein. The configuration manager 1118 can be implemented with hardware components and/or in software as one of the device applications 1114, such as when the example device 1100 is implemented as the mobile device 102 described with reference to FIGS. 1-10. An example of the configuration manager 1118 is the configuration manager 116 implemented in the mobile device 102, such as a software application and/or as hardware components in the wireless device. In implementations, the configuration manager 1118 may include independent processing, memory, and logic components as a computing and/or electronic device integrated with the example device 1100.

The example device 1100 can also include a microphone 1120 and/or camera devices 1122, as well as proximity and/or motion sensors 1124, such as may be implemented as components of an inertial measurement unit (IMU). The proximity and/or motion sensors 1124 can be implemented with various sensors, such as a gyroscope, an accelerometer, and/or other types of motion sensors to sense motion of the device. The motion sensors 1124 can generate sensor data vectors having three-dimensional parameters (e.g., rotational vectors in x, y, and z-axis coordinates) indicating location, position, acceleration, rotational speed, and/or orientation of the device. The example device 1100 can also include one or more power sources 1126, such as when the device is implemented as a wireless device and/or mobile device. The power sources may include a charging and/or power system, and can be implemented as a flexible strip battery, a rechargeable battery, a charged super-capacitor, and/or any other type of active or passive power source.

The example device 1100 can also include an audio and/or video processing system 1128 that generates audio data for an audio system 1130 and/or generates display data for a display system 1132. The audio system and/or the display system may include any types of devices or modules that generate, process, display, and/or otherwise render audio, video, display, and/or image data. Display data and audio signals can be communicated to an audio component and/or to a display component via any type of audio and/or video connection or data link. In implementations, the audio system and/or the display system are integrated components of the example device 1100. Alternatively, the audio system and/or the display system are external, peripheral components to the example device.

Although implementations of rollable screen device thermal mitigation have been described in language specific to features and/or methods, the appended claims are not necessarily limited to the specific features or methods described. Rather, the specific features and methods are disclosed as example implementations of rollable screen device thermal mitigation, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A mobile device, comprising: a compact form factor and an expanded form factor; at least one heat source configured to generate heat within the mobile device; and a configuration manager configured to initiate expanding the mobile device from the compact form factor to the expanded form factor based at least in part on one of a thermal load, a device temperature, or a device component temperature.

Alternatively or in addition to the above described mobile device, any one or combination of: the mobile device is at least one of a foldable mobile device or an expandable mobile device with a rollable display screen configurable in one of multiple display states corresponding to respective device form factors. The mobile device further comprising a slidable display mount operable to one of extend the rollable display screen corresponding to the expanded form factor or retract the rollable display screen corresponding to the compact form factor, and wherein the configuration manager is configured to initiate operation of the slidable display mount to expand from the compact form factor to the expanded form factor. The configuration manager is configured to detect the heat, and initiate expanding the mobile device based at least in part on detection of the heat. The configuration manager is configured to detect charging a battery of the mobile device, and initiate expanding the mobile device based at least in part on detection of the charging the battery. The configuration manager is configured to detect an end of the charging the battery, and initiate contracting the mobile device from the expanded form factor to the compact form factor based on the end of the charging the battery and previous expanding of the mobile device. Wherein, to initiate expanding the mobile device from the compact form factor to the expanded form factor, the configuration manager is configured to initiate displaying a user interface message to direct a manual expansion of the mobile device. The configuration manager is configured to determine from one or more sensor inputs that the mobile device is stationary before initiating to expand the mobile device from the compact form factor to the expanded form factor. The configuration manager is configured to determine that the mobile device is stationary and charging a battery of the mobile device before initiating to expand the mobile device from the compact form factor to the expanded form factor. The mobile device further comprising an additional heat source in the mobile device, and wherein the at least one heat source and the additional heat source both generate the heat within the mobile device, and expansion of the mobile device increases a distance between the at least one heat source and the additional heat source. A surface area of the mobile device contributes to dissipation of the heat, and expansion of the mobile device increases the surface area and the dissipation of the heat.

A method, comprising: generating heat within a mobile device from at least one heat source; and expanding the mobile device from a compact form factor to an expanded form factor based at least in part on one of a thermal load, a device temperature, or a device component temperature.

Alternatively or in addition to the above described method, any one or combination of: the mobile device is at least one of a foldable mobile device or an expandable mobile device with a rollable display screen configurable in one of multiple display states corresponding to respective device form factors. The method further comprising detecting the heat, and wherein the mobile device is expanded based at least in part on detection of the heat. The method further comprising detecting charging a battery of the mobile device, and wherein the mobile device is expanded based at least in part on detection of the charging the battery. The method further comprising detecting an end of the charging the battery; and contracting the mobile device from the expanded form factor to the compact form factor based on the end of the charging the battery and previous expanding of the mobile device. The method further comprising determining from one or more sensor inputs that the mobile device is stationary before expansion of the mobile device from the compact form factor to the expanded form factor. The method further comprising determining that the mobile device is stationary and charging a battery of the mobile device before expansion of the mobile device from the compact form factor to the expanded form factor. The at least one heat source and an additional heat source both generate the heat within the mobile device, and expansion of the mobile device increases a distance between the at least one heat source and the additional heat source.

A system, comprising: a heat source to generate heat within a mobile device; a sensor to detect the heat as one of a thermal load, a device temperature, or a device component temperature; and a control unit to configure the mobile device for increased heat dissipation based at least in part on detection of the heat.

The invention claimed is:

1. A mobile device, comprising:
   a rollable display screen;
   a slidable display mount operable to retract the rollable display screen corresponding to a compact form factor of the mobile device, and the slidable display mount operable to extend the rollable display screen corresponding to an expanded form factor of the mobile device;
   at least one heat source configured to generate heat within the mobile device; and
   a configuration manager configured to initiate operation of the slidable display mount to expand the mobile device from the compact form factor to the expanded form factor based at least in part on one of a thermal load, a device temperature, or a device component temperature.

2. The mobile device of claim 1, wherein the configuration manager is configured to detect the heat, and initiate expanding the mobile device based at least in part on detection of the heat.

3. The mobile device of claim 1, wherein the configuration manager is configured to detect charging a battery of the mobile device, and initiate expanding the mobile device based at least in part on detection of the charging the battery.

4. The mobile device of claim 3, wherein the configuration manager is configured to detect an end of the charging the battery, and initiate contracting the mobile device from the expanded form factor to the compact form factor based on the end of the charging the battery and previous expanding of the mobile device.

5. The mobile device of claim 1, wherein, to initiate expanding the mobile device from the compact form factor to the expanded form factor, the configuration manager is configured to initiate displaying a user interface message to direct a manual expansion of the mobile device.

6. The mobile device of claim 1, wherein the configuration manager is configured to determine from one or more sensor inputs that the mobile device is stationary before initiating to expand the mobile device from the compact form factor to the expanded form factor.

7. The mobile device of claim 1, wherein the configuration manager is configured to determine that the mobile device is stationary and charging a battery of the mobile device before initiating to expand the mobile device from the compact form factor to the expanded form factor.

8. The mobile device of claim 1, further comprising an additional heat source in the mobile device, and wherein the at least one heat source and the additional heat source both generate the heat within the mobile device, and expansion of the mobile device increases a distance between the at least one heat source and the additional heat source.

9. The mobile device of claim 1, wherein a surface area of the mobile device contributes to dissipation of the heat, and expansion of the mobile device increases the surface area and the dissipation of the heat.

10. A method, comprising:

generating heat within a mobile device from at least one heat source;

initiating operation of a slidable display mount that operates to one of retract a rollable display screen corresponding to a compact form factor of the mobile device, or extend the rollable display screen corresponding to an expanded form factor of the mobile device; and expanding, by the operation of the slidable display mount, the mobile device from the compact form factor to the expanded form factor based at least in part on one of a thermal load, a device temperature, or a device component temperature.

11. The method of claim 10, further comprising:

detecting the heat, and wherein the mobile device is expanded based at least in part on detection of the heat.

12. The method of claim 10, further comprising:

detecting charging a battery of the mobile device, and wherein the mobile device is expanded based at least in part on detection of the charging the battery.

13. The method of claim 12, further comprising:

detecting an end of the charging the battery; and contracting the mobile device from the expanded form factor to the compact form factor based on the end of the charging the battery and previous expanding of the mobile device.

14. The method of claim 10, further comprising:

determining from one or more sensor inputs that the mobile device is stationary before expansion of the mobile device from the compact form factor to the expanded form factor.

15. The method of claim 10, further comprising:

determining that the mobile device is stationary and charging a battery of the mobile device before expansion of the mobile device from the compact form factor to the expanded form factor.

16. The method of claim 10, wherein the at least one heat source and an additional heat source both generate the heat within the mobile device, and expansion of the mobile device increases a distance between the at least one heat source and the additional heat source.

17. A system, comprising:

a heat source to generate heat within a mobile device, the mobile device including a rollable display screen that is retractable corresponding to a compact form factor of the mobile device, and the rollable display screen is extendable corresponding to an expanded form factor of the mobile device;

a sensor to detect the heat as one of a thermal load, a device temperature, or a device component temperature; and a control unit to configure the mobile device by extending the rollable display screen corresponding to expanding the mobile device for increased heat dissipation based at least in part on detection of the heat.

18. The system of claim 17, wherein the control unit is configured to expand the mobile device by extending the rollable display screen for increased heat dissipation based at least in part on detection of charging a battery of the mobile device.

19. The system of claim 18, wherein the control unit is configured to detect an end of the charging the battery, and contract the mobile device from the expanded form factor to the compact form factor based on the end of the charging the battery.

20. The system of claim 17, wherein the control unit is configured to determine from one or more sensor inputs that the mobile device is stationary before expansion of the mobile device from the compact form factor to the expanded form factor.

* * * * *